(12) United States Patent
Steinberg

(10) Patent No.: US 9,437,350 B2
(45) Date of Patent: Sep. 6, 2016

(54) ELECTRICAL LINE FOR A MOTOR VEHICLE

(71) Applicant: NEXANS, Paris (FR)

(72) Inventor: Helmut Steinberg, Stoernstein (DE)

(73) Assignee: NEXANS, Paris (FR)

( * ) Notice: Subject to any disclaimer, the term of this patent is extended or adjusted under 35 U.S.C. 154(b) by 290 days.

(21) Appl. No.: 14/052,890

(22) Filed: Oct. 14, 2013

(65) Prior Publication Data

US 2014/0112614 A1   Apr. 24, 2014

(30) Foreign Application Priority Data

Oct. 23, 2012 (EP) .................................. 12306308

(51) Int. Cl.
| | | |
|---|---|---|
| *H01B 7/32* | (2006.01) | |
| *H01B 11/22* | (2006.01) | |
| *G01M 11/08* | (2006.01) | |
| *B60L 3/04* | (2006.01) | |
| *B60L 3/00* | (2006.01) | |
| *B60L 11/00* | (2006.01) | |
| *B60L 11/18* | (2006.01) | |
| *G02B 6/44* | (2006.01) | |
| *G01M 5/00* | (2006.01) | |

(52) U.S. Cl.
CPC ............... *H01B 7/32* (2013.01); *B60L 3/0069* (2013.01); *B60L 3/04* (2013.01); *B60L 11/005* (2013.01); *B60L 11/1803* (2013.01); *G01M 5/0033* (2013.01); *G01M 11/085* (2013.01); *G01M 11/086* (2013.01); *H01B 7/328* (2013.01); *H01B 11/22* (2013.01); *B60L 2210/40* (2013.01); *G01M 5/0025* (2013.01); *G01M 5/0091* (2013.01); *G02B 6/4416* (2013.01); *Y02T 10/7005* (2013.01); *Y02T 10/7022* (2013.01); *Y02T 10/7241* (2013.01)

(58) Field of Classification Search
CPC ...... G02B 6/4416; H01B 7/32; H01B 7/328; H01B 11/22
See application file for complete search history.

(56) References Cited

U.S. PATENT DOCUMENTS

| | | | | |
|---|---|---|---|---|
| 5,015,859 | A * | 5/1991 | Uejio ................... | G01M 11/085 250/227.14 |
| 5,178,465 | A * | 1/1993 | Amano ................. | G01R 31/088 250/227.29 |
| 6,949,933 | B2 * | 9/2005 | Weaver ................. | G01R 31/021 324/541 |
| 7,154,081 | B1 * | 12/2006 | Friedersdorf .......... | G01B 11/18 250/227.14 |
| 8,005,324 | B2 * | 8/2011 | Bremnes ............... | G01M 11/088 385/12 |
| 2005/0244116 | A1 | 11/2005 | Evans | |
| 2008/0135275 | A1 | 6/2008 | Zamzow et al. | |
| 2012/0213483 | A1 * | 8/2012 | Risch ....................... | G02B 6/44 385/113 |

\* cited by examiner

*Primary Examiner* — Daniel Petkovsek
(74) *Attorney, Agent, or Firm* — Sofer & Haroun, LLP

(57) ABSTRACT

An electrical line (5) for electrically conductively connecting two units arranged in a motor vehicle, where the units have insulated electrical conductors surrounded by a common electrically effective screen. Over the entire length of the line (5) the construction of the line includes at least one light conductor (10) which is connected in the operating position to an evaluating unit (12) coupled to a switching element (11), and is integrated in the screen (9) of the line (5), or is arranged directly underneath the screen (9) of the line (5) while being in contact with the line (5), so that damage to the line (5) leads with certainty at least to a deformation of the light conductor (10) which leads to a signal which can be recognized by the evaluating unit (12).

1 Claim, 1 Drawing Sheet

ELECTRICAL LINE FOR A MOTOR VEHICLE

RELATED APPLICATION

This applications claims the benefit of priority from European Patent Application No. 12 306 308.3, filed on Oct. 23, 2012, the entirety of which is incorporated by reference.

BACKGROUND

1. Field of the Invention

The invention relates to an electrical line for electrically conductively connecting two units arranged in a motor vehicle, wherein the line includes insulated electrical conductors which are surrounded by a common, electrically effective screen. Such a line is disclosed in EP 1 921 635 B1.

2. Description of the Related Art

Such a line can be used in a motor vehicle driven by an electric motor—in the following called "vehicle" for short—and also in a vehicle which has an internal combustion engine and an electric motor as drives in accordance with hybrid technology. The electric motor is in both types of embodiments of the drive fed from an appropriately dimensioned energy source. It is a three phase current motor in accordance with no technology by means of which an alternating current is produced by using an inverter which is also accommodated in the vehicle for the operation of the three phase current motor. For example, the energy source is an energy storage means which is composed of a plurality of capacitors (ultracaps) which may be accommodated in the trunk of a vehicle. The capacity of the capacitors is sufficient for a short term operation of the electric motor. They are recharged, for example, during braking operation of the vehicle by the electric motor which is then acting as a generator. For operating the electric motor, the electric motor is connected to the inverter by means of an electrical line, which in turn, is connected to the energy storage means through an electrical line. Consequently, "units" are in particular the electric motor, the inverter and the energy storage means.

EP 1 1921 635 B1 describes a cooling device for a vehicle which has a drive consisting of two motors, wherein the one motor is an internal combustion engine and the other is an electric motor connected through an electrical line to an inverter which is connected to the electrical energy source. The line consists of three electrical conductors which, together with at least two pipes in the form of a flat line, are arranged at a spacing from each other and are embedded in a common support of insulating material. The pipes are connected, on the one hand, to cooling elements of the energy source and the inverter and, on the other hand, are connected to a heat exchanger for forming a cooling agent cycle. A light wave conductor is arranged on one side of the support at a distance from one of the pipes connectable to the measuring and evaluating unit, wherein the measuring and evaluating unit serves to monitor the line for damage.

The cable according to U.S. 2005/0244116 A1 includes transmission elements which may also be electrical conductors which are arranged in a cable center around a tension proof core. The cable center is surrounded by several mechanically stable layers, wherein two steel reinforcements are among the mechanically stable layers. A synthetic casing is arranged over the outer steel reinforcement, wherein optical fibers are embedded in the outer steel reinforcement. These fibers are connected to a monitoring device. Damage to the cable is to be avoided by means of the fibers, which damage is produced for example, by heat, solvents, or other chemical substances. It is to be ensured in this manner that the transmission of sensitive data through the cable is not impaired.

The above mentioned EP 1 921 635 B1 discloses an electrical line which serves to electrically connect a unit mounted in a vehicle to an electric energy source which is also arranged in the vehicle and/or to another electrical unit. The line is constructed as a three phase line with three insulated electrical conductors, wherein each of the conductors has a circumferentially closed individual electrical screen which rests against its insulation. In addition, an outer screen is present which commonly encloses the three screened conductors with the intermediate arrangement of insulation material. At least at an end of the line, a coupling element equipped with electrical contacts which are insulated relative to each other or mounted in a moisture proof manner, wherein the electrical conductors, the individual screens thereof, and the outer screen are mounted separately of each other. Such a line is protected against electromagnetic radiation and it cannot produce any interference radiation as long as the screens are effective.

OBJECTS AND SUMMARY

The invention is based on the object of constructing the line described in the beginning in such a way that its functional security can be checked in a simple manner.

In accordance with the invention this object is met in that, over the entire length of the line in the construction thereof, at least one light conductor is present which in the operating position is connected to an evaluating unit coupled to a switching element, and which is integrated in the screen of the line or is arranged immediately below the screen of the line while being in contact with the screen so that any damage to the line produces with certainty at least a deformation of the light conductor, which results in a signal which can be recognized by the evaluating unit.

This line includes a structural component by means of which the functional safety or integrity is constantly monitored in the at least one light conductor integrated in the screen or contacting the screen on the inside. This is of particular importance if the line is used as a high voltage line and is connected to an electrical voltage source of up to 600V. Consequently, damage to the line can lead to an endangerment of the people in the vehicle. As a result of the light conductor being arranged far outside, damage or deformation of the conductor which causes damage to the line, particularly of the screen thereof, is immediately registered by the evaluating unit through which light or light pulses are continuously coupled into the light conductor. By means of an appropriate signal of the evaluating unit, the switching element coupled thereto is activated, whereby the line is separated from the voltage source immediately after being damaged. For example, the evaluating unit can be equipped with a reflectometer which recognizes a signal reflected at a deformation point or an interruption of the signal reflected by the light conductor.

BRIEF DESCRIPTION OF THE DRAWINGS

Embodiments of the subject matter of the invention are illustrated in the drawings.

In the drawing.

DETAILED DESCRIPTION

Figure 1:
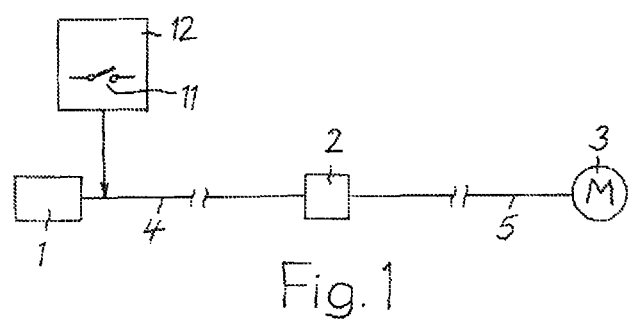
FIG. 1 is a schematic illustration of a current supply unit for an electric motor of a vehicle.

In the drawings, only those details are illustrated which are required for an understanding of the invention. Any coupling elements, which in the case of operation, may be connected to a line are not illustrated for simplicity's sake.

FIG. 1 schematically shows an energy source 1 which is composed of a plurality of capacitors or a battery constructed in any other manner, a transformer 2 and an electric motor 3 constructed as a three phase motor. Energy source 1 and transformer 2 are, for example, connected to each other through a double strand line 4 which, for protection against electromagnetic radiation (EMV), may be surrounded by a screen. Connected between transformer 2 and electric motor 3 is, for example, a three strand electrical line 5.

Figure 2:
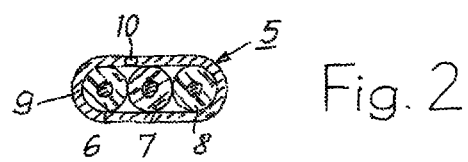
FIG. 2 is a cross sectional view through the line according to the invention.

The line 5 includes in the embodiment of FIG. 2 three electrical conductors 6, 7 and 8 as the three phase conductors which, in accordance with a preferred embodiment, are located in a plane next to each other. The three conductors 6, 7 and 8 could also be stranded together. It is also possible to combine at least one additional conductor serving another purpose with the three conductors. Conductors 6, 7 and 8 consist of an electrically well conducting core which is surrounded by an insulation. Copper is preferably used for the core. The insulation may consist, for example, of polyethylene.

The conductors 6, 7 and 8 are surrounded by a common electrically effective screen 9 which, in a preferred embodiment, is constructed as a woven fabric of copper wires. In addition, the line construction includes over the entire length of the line 5 a light conductor 10 which, in accordance with FIG. 2, is integrated into the screen 9. When the screen 9 is manufactured, the light conductor 10 is advantageously integrated into the screen 9 as "wire." It advantageously is composed of a polymer material. When the assembly of the line 5 is concluded, the light conductor 10 is connected to an evaluating unit 12 which is equipped with a switching element 11, which is schematically illustrated in FIG. 1. The construction of the line 5 is to have at least one light conductor 10.

For example, the evaluating unit 12 may be arranged in the inverter 2. It switches off the current flowing through the line 5 by a gate or a relay. An explosive charge can also be used as a switching element 11 through which, in the event damage to the line 5 is observed, the connecting terminals of the line 5 can be blown away at the energy source 1, so that the arrangement becomes completely without power.

Figure 3:
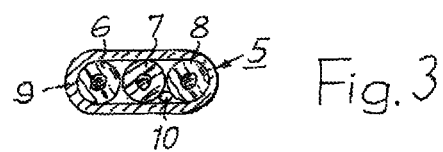
FIG. 3 shows, also in a sectional view, another embodiment of the line as compared to FIG. 2.

According to FIG. 3, the tight conductor 10 can also be arranged underneath the screen 9 of the line 5 while being in contact with the screen.

The invention claimed is:

1. An electrical line for electrically conductively connecting two units arranged in a motor vehicle, said electrical line comprising:
   at least one electrical conductor;
   an electrically conductive screen surrounding said least one electrical conductor; and
   at least one light conductor, said light conductor is either one of integrated in said electrically conductive screen or positioned directly underneath and in contact with said electrically conductive screen, said at least one light conductor extending over the entire length of said electrical line,
   wherein said light conductor is connected to an evaluating unit,
   wherein said electrically conductive screen and said light conductor are arranged together in a manner that deformation of said screen simultaneously deforms said light conductor, the deformation of said light conductor being detectable at said evaluating unit as a signal change within said light conductor, and
   wherein said evaluating unit is connected to a switching element, said switching unit configured to disconnect said electrical line from power in the event said evaluating unit detects a signal change within said light conductor.

* * * * *